Dec. 29, 1931.  J. L. WORTHINGTON  1,838,976
TREATER HAVING REVOLVING ELECTRODE WITH WAVE SHAPED ARMS
Filed Aug. 17, 1927

INVENTOR:
JOSEPH L. WORTHINGTON,
BY
ATTORNEY.

Patented Dec. 29, 1931

1,838,976

UNITED STATES PATENT OFFICE

JOSEPH L. WORTHINGTON, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

TREATER HAVING REVOLVING ELECTRODE WITH WAVE SHAPED ARMS

Application filed August 17, 1927. Serial No. 213,664.

My invention relates to the art of treating mixtures of liquids for the purpose of separating said liquids and more particularly to methods and apparatus for accomplishing this treatment electrically.

My invention may be used in separating liquids from many different mixtures but it is particularly useful in separating the phases of an emulsion.

In the usual method and apparatus employed for electrically separating the phases of an emulsion, in which the dispersed phase comprises particles of a conducting liquid, a pair of electrodes is held in spaced relation to form a treating space. An electric field is set up in the treating space between the electrodes and an emulsion is then passed through this space. In the treaters heretofore used, the distance between the electrodes has been substantially uniform throughout the treatment so that the field has a constant voltage per unit-distance of the gap between the electrodes. I have discovered that a field which increases slowly in voltage per unit-distance of gap and then suddenly decreases in voltage has a marked accelerating effect upon the treatment of the emulsion.

It is an object of my invention to provide a novel method of and apparatus for treating fluids electrically in which an electric treating field increases gradually per unit-distance of gap and decreases suddenly from maximum value.

In previously used treaters means have been provided on the electrodes for forming areas of maximum potential gradient which have a relatively fixed potential value.

It is a further object of my invention to provide a novel method and apparatus as mentioned above in which a series of areas of maximum potential gradient is provided in the treating field, the value of which rises gradually to the maximum and diminishes rapidly from the maximum toward the minimum value.

The rotation of one electrode of a treater relative to the other has been accomplished in many different ways, some of which are quite expensive to construct and difficult to maintain in operation. It is an object of my invention to provide a novel treater in which a simple means is utilized for causing the rotation of one of the electrodes thereof, which means functions automatically with the passage of liquid through the treater.

In the method of treatment above outlined, the dispersed phase of the emulsion is not entirely separated in the electric treating space, but is merely agglomerated into large drops which separate out by gravity when the treated emulsion is allowed to stand in a settling tank. In many treaters such a settling tank is formed as a part of the treater, but I have found that in all of these the operation of the settling tank is impaired by the proximity thereto of the electric treating space where the emulsion is usually highly agitated.

It is a still further object of my invention to provide a treater having a settling chamber into which the treated fluid is discharged in a manner to facilitate separation of the constituents of the fluid by gravity.

Further objects and advantages will be made manifest in the accompanying drawings in which a preferred embodiment of my invention is illustrated.

In the drawings,—

Figure 1:
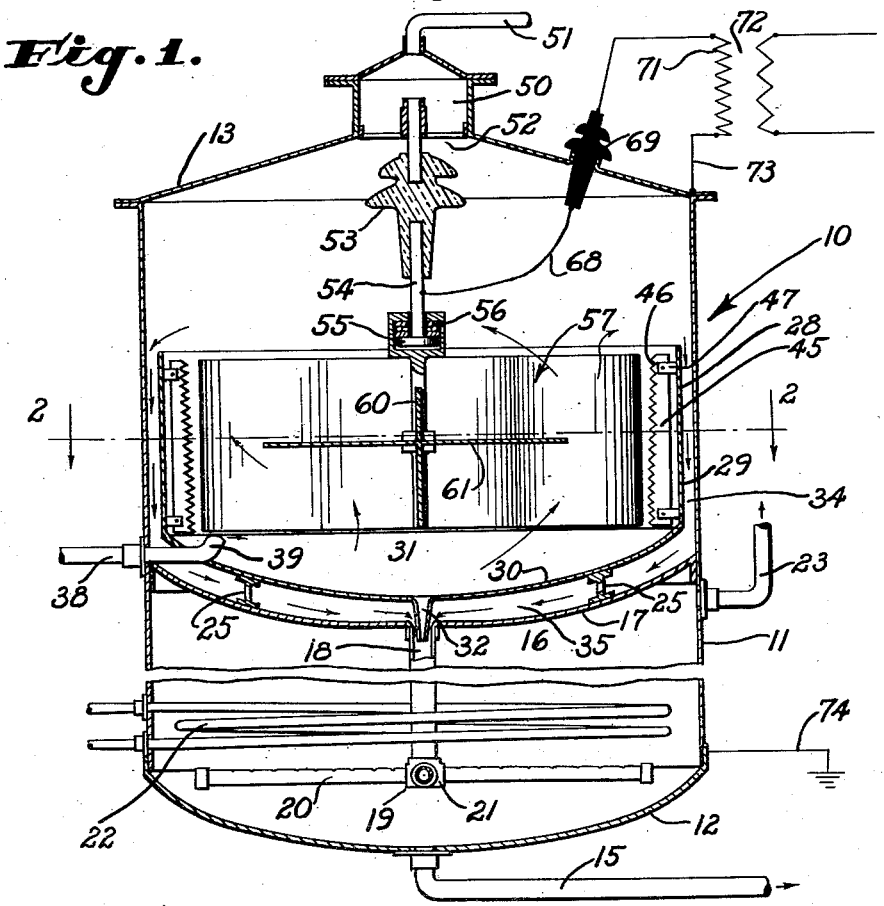
Fig. 1 is a vertical sectional view diagrammatically illustrating the treater of my invention.

Referring specifically to the drawings, the treater of my invention may be generally designated by the numeral 10 and includes a shell 11 having a tight bottom 12 and a tight cover plate 13. Attached to the bottom 12 so as to connect with the interior of the shell 11 is a water outlet pipe 15. The bottom 12 is concave in shape so as to cause the liquid to drain to the center of the bottom, where the pipe 15 connects therewith.

Cooperating with the bottom 12 to form a settling chamber 16 in the lower portion of the shell 11 is an intermediate bottom plate 17 which has substantially the same concave shape as the bottom 12. Extending downward from the central portion of the plate 17 so as to connect with the space thereabove, is a conduit 18 which is provided with a manifold 19 which comprises a plurality of perforated spray pipes 20 extending radially from a hub 21 attached to the lower end of the conduit 18. The conduit 18 is of such length that the manifold 19 is disposed near the bottom of the settling space 16.

Disposed in the settling space 16, a short distance above the manifold 19, is a steam heating coil 22, the inlet and exhaust pipes of which pass through the shell 11. Leading from the upper portion of the settling space 16 is an oil outlet pipe 23.

Supported by piers 25, which rest upon the intermediate plate 17, is a cup 28 having side walls 29 and a bottom 30 which cooperate to provide an emulsion treating chamber 31. Provided centrally upon the bottom 30, so as to extend downward therefrom a short distance into the upper end of the pipe 18 and so as to connect with the lower portion of the chamber 31, is a water and sand drain pipe 32. The cup 28 is of such size that when it is centrally positioned, as shown in the drawings, an annular passage 34 is formed between the side wall 29 and the shell 11 which connects with a passage space 35 formed between the intermediate plate 17 and the cup bottom 30, with the central portion of which space 35 the pipe 18 connects. Extending through and making a tight fit with the shell 11 and the cup bottom 30 is an emulsion inlet pipe 38 which has an inner end thereof bent to form a tangential nozzle 39. The cup 28 forms a primary or grounded electrode and it is desirable that certain portions of this cup be formed to project inwardly from the surface thereof. To provide these inward prominent portions of the electrode 28, bars 45 having serrated inner edges 46 are mounted in a suitable manner on the inner surface of the cup 28 as by brackets 47. In the preferred embodiment shown, the inner edges 46 are not parallel with the axis of the cup 28 but diverge upward at a slight angle therefrom.

The cover plate 13 is provided with a gas dome 50, to the upper end of which a gas outlet pipe 51 connects. Supported centrally within the upper end of the shell 11 from a spider 52 provided in the mouth of the dome 50 is an insulator 53 which has a mandrel 54 extending axially downward therefrom. The mandrel 54 has a head 55 at its lower end which supports an anti-friction bearing 56 from which a secondary or live electrode 57 is suspended. The live electrode 57 includes a hub shaft 60, having a disc baffle 61 radiating from the central portion thereof and perpendicular thereto, and a series of wave-shaped blades 63 equally spaced around the shaft 60 and radiating therefrom, the shape of said blades being best illustrated in Fig. 2. The electrode 57 is adapted to be rotated by the impact of emulsion discharged from the nozzle 39 against the end portions of the blades 63. As the electrode 57 rotates, the outer ends of the blade 63 approach and pass close to the serrated edges 46 of the bars 45. The end portions 65 of the blades 63 are non-radial and are reversely curved so as to be disposed substantially spirally relative to the shaft 60.

The live electrode 57 is energized by means of an electric conductor 68 which passes through an insulator 69, provided in the cover plate 13, to the exterior of the shell 11 where it connects with one terminal of the secondary 71 of a transformer 72. The other terminal of the secondary 71 is grounded as by a conductor 73 to the shell 11 which in turn is grounded to the earth by a conductor 74.

The operation of my invention is as follows:

Before commencing the treatment of the emulsion, the interior of the shell 11 is filled with a dielectric liquid which is preferably a dry oil of similar quality to the oil in the emulsion to be treated. The electrode 57 is now energized by supplying a current of suitable voltage to the transformer 72. The pipe 38 is now supplied with emulsion so that this is discharged from the nozzle 39 into contact with the blades 63 to cause rotation of the electrode 57. As the electrode 57 rotates, the end portions 65 of the blades 63 successively approach and pass each of the grounded electrode bars 45, as clearly shown in Fig. 2.

Figure 2:
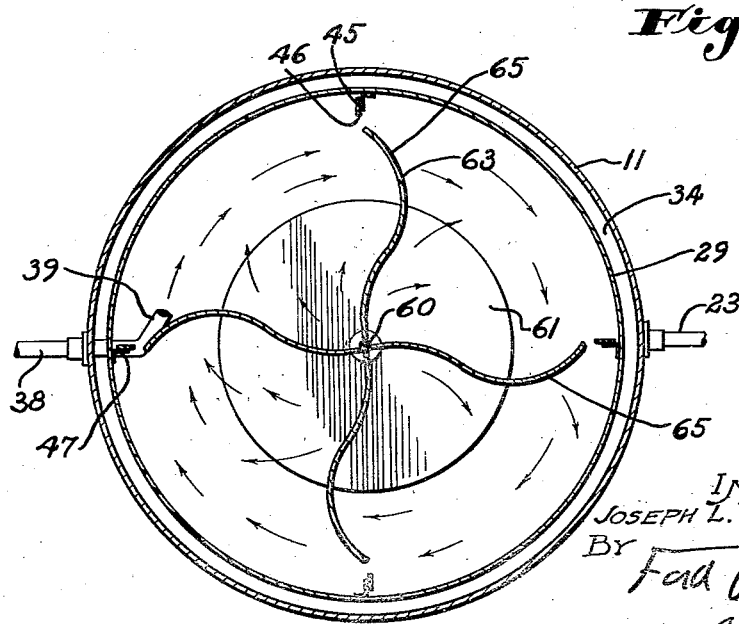
Fig. 2 is a horizontal sectional view taken on the line 2—2 of Fig. 1.

Owing to the spiral disposition of the end portions 65, a field is set up between each of the portions 65 and the bars 45 as the former approaches the latter, which fields gradually increase to the maximum potential per unit-distance of gap, which is attained when the relation between these elements is as shown in Fig. 2. As the extremity of each blade 63 passes by a bar 45, the potential per unit-distance of gap is suddenly decreased. I have found that the gradually increasing and suddenly decreasing field set up in the manner above described is unusually efficacious in the treatment of oil and water emulsions for the separation of the phases thereof. I am not able to state positively why this gradual increase and sudden decrease of the potential per unit-distance of gap acts in this way, but believe that it is because of the utilization of the gradually increasing field for the treatment of the emulsion up to the point of maximum potential per unit-distance of gap where short-circuiting chains are extremely likely to be formed. The formation of these chains is prevented by the sudden decrease in the potential per unit-distance of gap. Thus, a much higher potential per unit-distance of gap may be utilized with a corresponding increase in effectiveness of the treatment without the disadvantage of the formation of short-circuiting chains.

The serrated edges 46 upon the bars 45 produce a series of areas of maximum potential gradient which increase the effect of the field upon the emulsion. The formation of these areas in combination with the "whipping" of the field is an important feature of this invention.

As the emulsion enters the chamber 31 through the nozzle 39, oil is permitted to escape from the settling chamber 16 through the oil outlet pipe 23. This causes a flow of treated emulsion up out of the chamber 31 down through the passages 34 and 35 and through the conduit 18 to the manifold 19. As the treated emulsion is discharged upward from the perforated pipes 20 of the manifold 19, it is heated by the steam coil 22. This heating of the emulsion accelerates the separation of the phases thereof which was begun in the electrical treatment in the chamber 31. The depth of the settling space 16 is sufficient for complete separation of the water and oil phases of the emulsion so that the water drops downward and is drawn off through the pipe 15 while the oil floats to the top of the space 16 and is drawn off through the pipe 23.

The plate 61 of the electrode 57 lies in a horizontal plane and forces all the emulsion discharged from the nozzle 39 outward into the influence of the field set up between the electrode 57 and the bars 45.

A certain portion of the emulsion entering through the pipe 38 comprises free water and sediment which settles to the bottom of the electric treating space 31 from which it drains downward through the drain pipe 32 and is discharged from the manifold 19 and carried out of the settling space 16 through the pipe 15.

While I have particularly described my invention in the capacity of treating petroleum, it should be understood that its utility is also extended to treating various other fluids with the object in view of separating the constituents thereof. I am not, therefore, limited to such use with a petroleum emulsion.

Certain of the features shown in the present application are also shown and claimed in copending applications of Harold C. Eddy, Serial No. 127,951, and John T. Worthington, Serial No. 220,338, the apparatus shown in the instant application being an improvement thereon. So also, other features of this invention relating to the type of gradient produced are claimed in a copending application of Harold C. Eddy, Serial No. 128,294, and a copending application of W. O. Eddy, Serial No. 158,949, contains claims directed to the electrode-moving means herein disclosed.

I claim as my invention:

1. A method of treating fluids which consists in defining a treating space, setting up an electric field in said space, gradually raising the potential of said field per unit-distance of its gap, setting up a series of areas of maximum potential gradient in said field, and suddenly decreasing said potential.

2. In a fluid treater, the combination of: means defining a treating chamber; a grounded electrode disposed in said chamber; a live electrode in said chamber; means for setting up an electric field between said electrodes, one of said electrodes having blades, terminal portions of said blades being spirally disposed and having edges adapted to extend into proximity with prominent portions of the other electrodes; and means forming a jet of fluid contacting said blades to rotate said electrode having said blades relative to the other electrode.

3. In a fluid treater, the combination of: means defining a treating chamber; a grounded electrode disposed in said chamber; a live electrode in said chamber; means for setting up an electric field between said electrodes, one of said electrodes having blades, terminal portions of said blades being spirally disposed and having edges adapted to extend into proximity with prominent portions of the other electrode; means forming a jet of fluid contacting said blades to rotate said electrode having said blades relative to the other electrode; and means for forming areas of maximum potential gradient adjacent one of said electrodes.

4. In a dehydrator, the combination of: a primary electrode; a secondary rotatable electrode having non-radial blades extending toward said primary electrode, the central axis of each blade lying in a plane substantially perpendicular to the axis of rotation of said secondary electrode; and means for rotating one of said electrodes relative to the other electrode whereby a fluid particle between said electrodes is subjected to a field of gradually increasing gradient and quickly decreasing gradient.

5. In a dehydrator, the combination of: a primary electrode; a secondary electrode having blades, the end portions of which extend spirally toward said primary electrode; and means for rotating one of said electrodes relative to the other electrode whereby a fluid particle between said electrodes is subjected to a field of gradually increasing gradient and quickly decreasing gradient.

6. In a dehydrator, the combination of: a primary electrode; a secondary electrode having non-radial blades extending toward said primary electrode; means for rotating one of said electrodes relative to the other electrode; and means on said primary electrode and extending toward the tips of said non-radial blades for forming areas of maximum potential gradient.

7. In a dehydrator, the combination of: a primary electrode; a secondary electrode having non-radial blades extending toward said primary electrode; means for rotating one of said electrodes relative to the other electrode; and bars on said primary electrode and extending toward said blades, each of said bars being closer to the ends of said blades at one end than at the other end.

8. A combination as defined in claim 6 in which said means on said primary electrode are spaced an angular distance equal to the angular displacement of the tips of said blades.

9. A combination as defined in claim 6 in which said means on said primary electrode are in the form of bars having serrated edges.

10. A combination as defined in claim 4 in which said blades are secured to a baffle for forcing the fluid to be treated toward said primary electrode.

11. In a dehydrator, the combination of: a shell; an intermediate plate dividing the interior of said shell into a treating chamber and a settling chamber; a primary cup-shaped electrode in said treating chamber, there being a channel between said intermediate plate and said cup electrode communicating with said settling chamber; a secondary electrode in said cup-shaped primary electrode; and means for introducing the fluid to be treated into the lower portion of said cup-shaped primary electrode.

12. In a dehydrator, the combination of: a shell; a cup-shaped primary electrode in said shell, there being a passage therebetween; a secondary electrode inside said primary electrode; and means for introducing the fluid to be treated into the lower portion of said primary electrode, said fluid filling said primary electrode and at least a portion thereof flowing through said passage.

13. In a dehydrator, the combination of: a cup-shaped member providing a chamber therein; means for establishing an electric field in said chamber; means for introducing the fluid to be treated into said chamber, said fluid filling said cup-shaped member and at least a portion of said fluid overflowing the upper walls of said member; withdrawal means communicating with the fluid overflowing said cup-shaped member; and withdrawal means communicating with the lower portion of said chamber.

14. In a dehydrator, the combination of: a shell; a cup-shaped member in said shell but spaced therefrom to define an annular passage; means for setting up an electric field in said cup-shaped member; means for introducing the emulsion to be treated into said cup-shaped member wherein said emulsion is treated, at least a portion of the treated emulsion overflowing said member and flowing downward through said annular passage; conduit means communicating with said annular passage and with the lower portion of said shell; and walls defining a drain means communicating between the lower interior of said cup-shaped member and with said conduit means.

15. In a dehydrator, the combination of: a shell; a cup-shaped member spaced from the inner walls of said shell and cooperating therewith in defining an annular space; a conduit below said cup-shaped member and extending into a body of washing medium in the lower portion of said shell; means for conducting fluid from said annular space to said conduit; a drain pipe extending downward into said conduit and communicating with the lowermost portion of the space inside said cup-shaped member; and means for electrically treating emulsion in said cup-shaped member.

16. In a dehydrator, the combination of: a primary electrode; a secondary electrode spaced from said primary electrode and including wave-shaped blades; means for rotatably mounting said secondary electrode; and a nozzle adjacent said secondary electrode and adapted to impinge a stream of emulsion against the surface of said secondary electrode to cause a rotation of said secondary electrode relative to said primary electrode, the axis of said stream being non-perpendicular to those portions of said blades against which said stream impinges.

In testimony whereof, I have hereunto set my hand at Los Angeles, California, this 12th day of August, 1927.

JOSEPH L. WORTHINGTON.